US012760583B2

(12) United States Patent
Tokudome et al.

(10) Patent No.: US 12,760,583 B2
(45) Date of Patent: Oct. 13, 2026

(54) DOOR OPENING AND CLOSING APPARATUS AND DOOR OPENING AND CLOSING METHOD

(71) Applicant: MINEBEA MITSUMI Inc., Nagano (JP)

(72) Inventors: Tetsuo Tokudome, Hiroshima (JP); Etsuro Watanabe, Hiroshima (JP); Yoichi Fujisaki, Hiroshima (JP)

(73) Assignee: MINEBEA MITSUMI INC., Nagano (JP)

( * ) Notice: Subject to any disclaimer, the term of this patent is extended or adjusted under 35 U.S.C. 154(b) by 53 days.

(21) Appl. No.: 18/849,624

(22) PCT Filed: Jan. 11, 2023

(86) PCT No.: PCT/JP2023/000386

§ 371 (c)(1),
(2) Date: Sep. 23, 2024

(87) PCT Pub. No.: WO2023/188679

PCT Pub. Date: Oct. 5, 2023

(65) Prior Publication Data

US 2025/0230697 A1 Jul. 17, 2025

(30) Foreign Application Priority Data

Mar. 29, 2022 (JP) ................................ 2022-054162

(51) Int. Cl.
*E05F 15/73* (2015.01)

(52) U.S. Cl.
CPC ......... *E05F 15/73* (2015.01); *E05Y 2900/546* (2013.01)

(58) Field of Classification Search
CPC ..... B60J 5/047; B60J 5/106; B60J 5/00; B60J 5/101; B60J 5/107; B60J 5/10; B60J 5/103; B60J 5/105
See application file for complete search history.

(56) References Cited

U.S. PATENT DOCUMENTS

2008/0204322 A1* 8/2008 Oswald ..................... G01S 5/04 342/465
2013/0311039 A1* 11/2013 Washeleski ............. E05F 15/46 701/36

(Continued)

FOREIGN PATENT DOCUMENTS

JP 2017-082390 A 5/2017
JP 2018-034793 A 3/2018

(Continued)

OTHER PUBLICATIONS

Tokutome Tetsuo (JP2017082390.translate); Door Opening and Closing Device. (Year: 2017).*

(Continued)

*Primary Examiner* — B M M Hannan
(74) *Attorney, Agent, or Firm* — Chrisman Gallo Tochtrop LLC

(57) ABSTRACT

A door opening and closing apparatus includes a setting unit configured to set at least a part of one of a first detection range and a second detection range as a start zone in which a first phase of a setting movement made by a detection target is to be detected, and to set a part of another one of the first detection range and the second detection range as a trigger zone in which a second phase of the setting movement is to be detected, based on first distances measured by a measurement unit. Upon determining that the detection target has made the setting movement including a movement between the start zone and the trigger, based on changes in the distances measured by the measurement unit, the control unit causes a driving unit to open or to close the door.

12 Claims, 11 Drawing Sheets

(56) References Cited

U.S. PATENT DOCUMENTS

| | | | | |
|---|---|---|---|---|
| 2014/0142815 | A1* | 5/2014 | Hirota | B60R 25/246 701/49 |
| 2015/0291126 | A1 | 10/2015 | Nicholls et al. | |
| 2017/0113652 | A1 | 4/2017 | Tokudome | |
| 2019/0249480 | A1 | 8/2019 | Tokudome | |
| 2020/0340286 | A1 | 10/2020 | Tokudome et al. | |
| 2021/0180390 | A1 | 6/2021 | Tokudome | |
| 2021/0214991 | A1 | 7/2021 | Cruz et al. | |
| 2023/0141908 | A1 | 5/2023 | Tokudome | |

FOREIGN PATENT DOCUMENTS

| | | | |
|---|---|---|---|
| JP | 2020-100963 | A | 7/2020 |
| JP | 2020-180523 | A | 11/2020 |
| WO | 2018/066507 | A1 | 4/2018 |
| WO | 2021210487 | A1 | 10/2021 |

OTHER PUBLICATIONS

International Search Report for corresponding International Application No. PCT/JP2023/000386 mailed Mar. 7, 2023.
Written Opinion for corresponding International Application No. PCT/JP2023/000386 dated Mar. 7, 2023 and English translation.
Office Action dated Nov. 25, 2025 for corresponding Japanese Application No. 2024-206500 and English translation.
Extended European Search Report EP23778719.7 Oct. 6, 2025.

* cited by examiner

Fig. 6

| FIRST DETECTOR | SECOND DETECTOR | POSITION OF DETECTION TARGET | MODE |
|---|---|---|---|
| MOVING OBJECT | IMMOVABLE OBJECT | – | LEFT ACCESS |
| IMMOVABLE OBJECT | MOVING OBJECT | – | RIGHT ACCESS |
| MOVING OBJECT | MOVING OBJECT | NEARER TO FIRST SENSOR | LEFT ACCESS |
| | | NEARER TO SECOND SENSOR | RIGHT ACCESS |
| | | CENTER | CENTER ACCESS |
| IMMOVABLE OBJECT | IMMOVABLE OBJECT | NEARER TO FIRST SENSOR | MAINTAIN |
| | | NEARER TO SECOND SENSOR | |
| | | CENTER | |

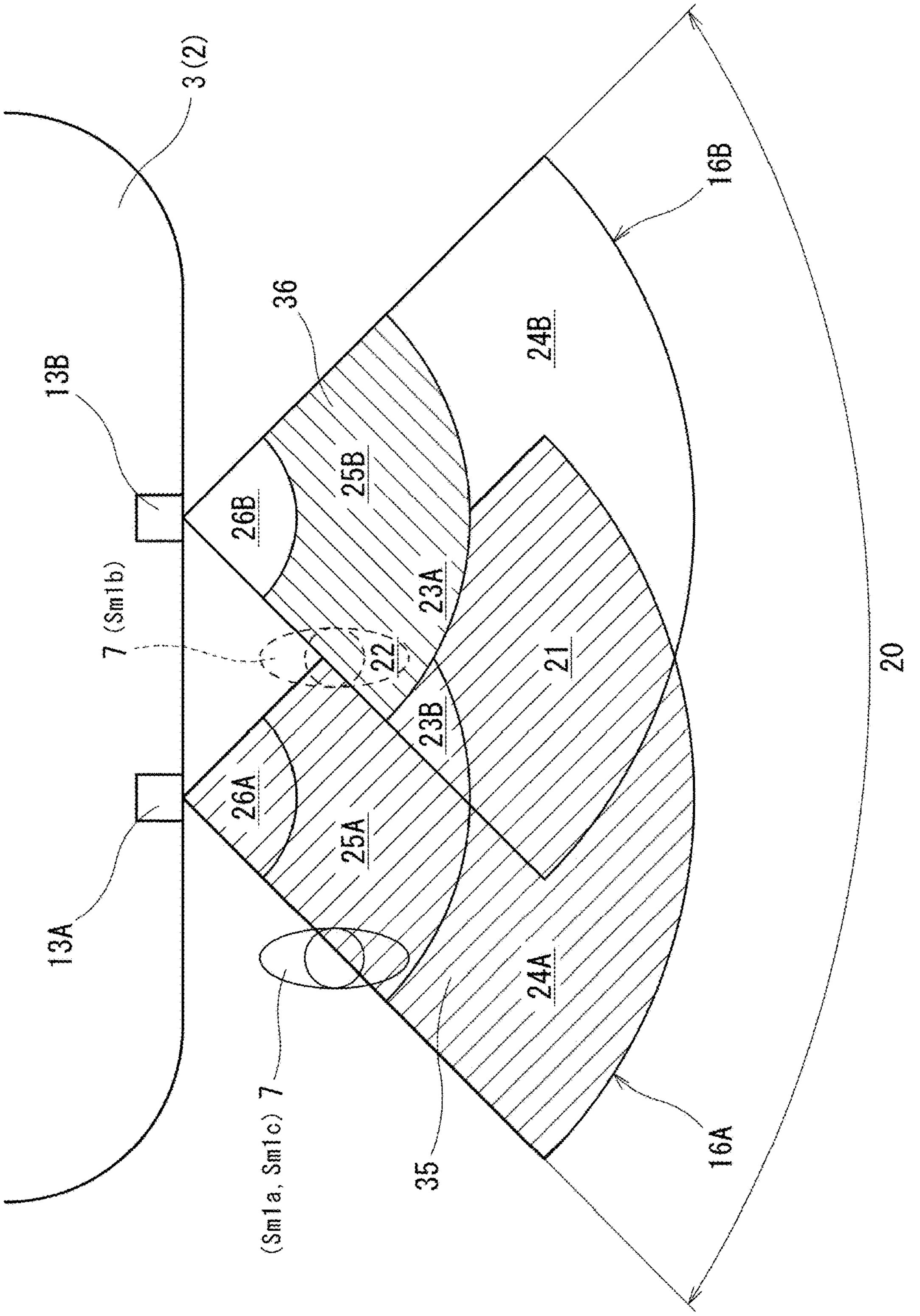
Fig. 7 LEFT ACCESS MODE

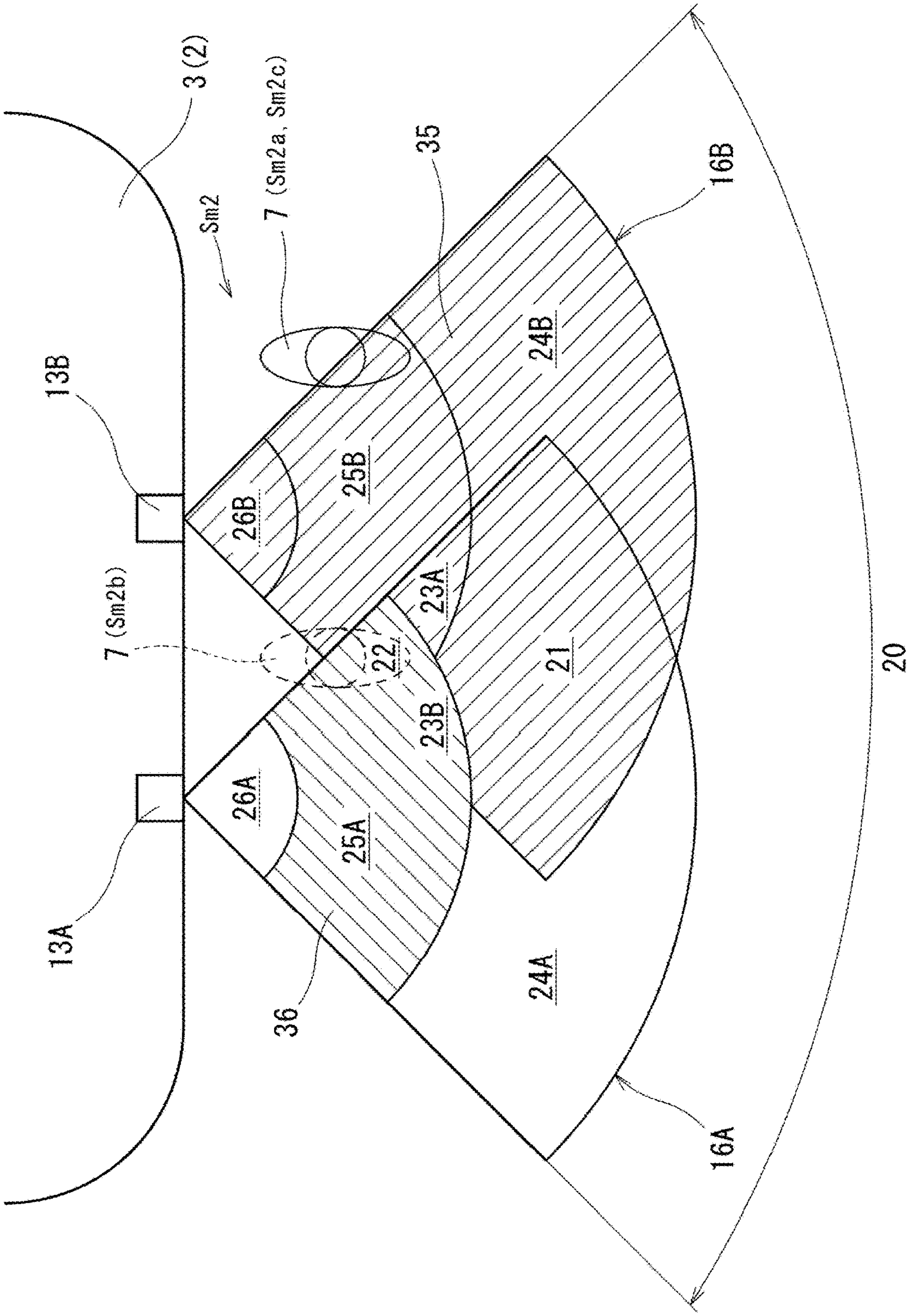
Fig. 8 RIGHT ACCESS MODE

Fig. 9 CENTER ACCESS MODE
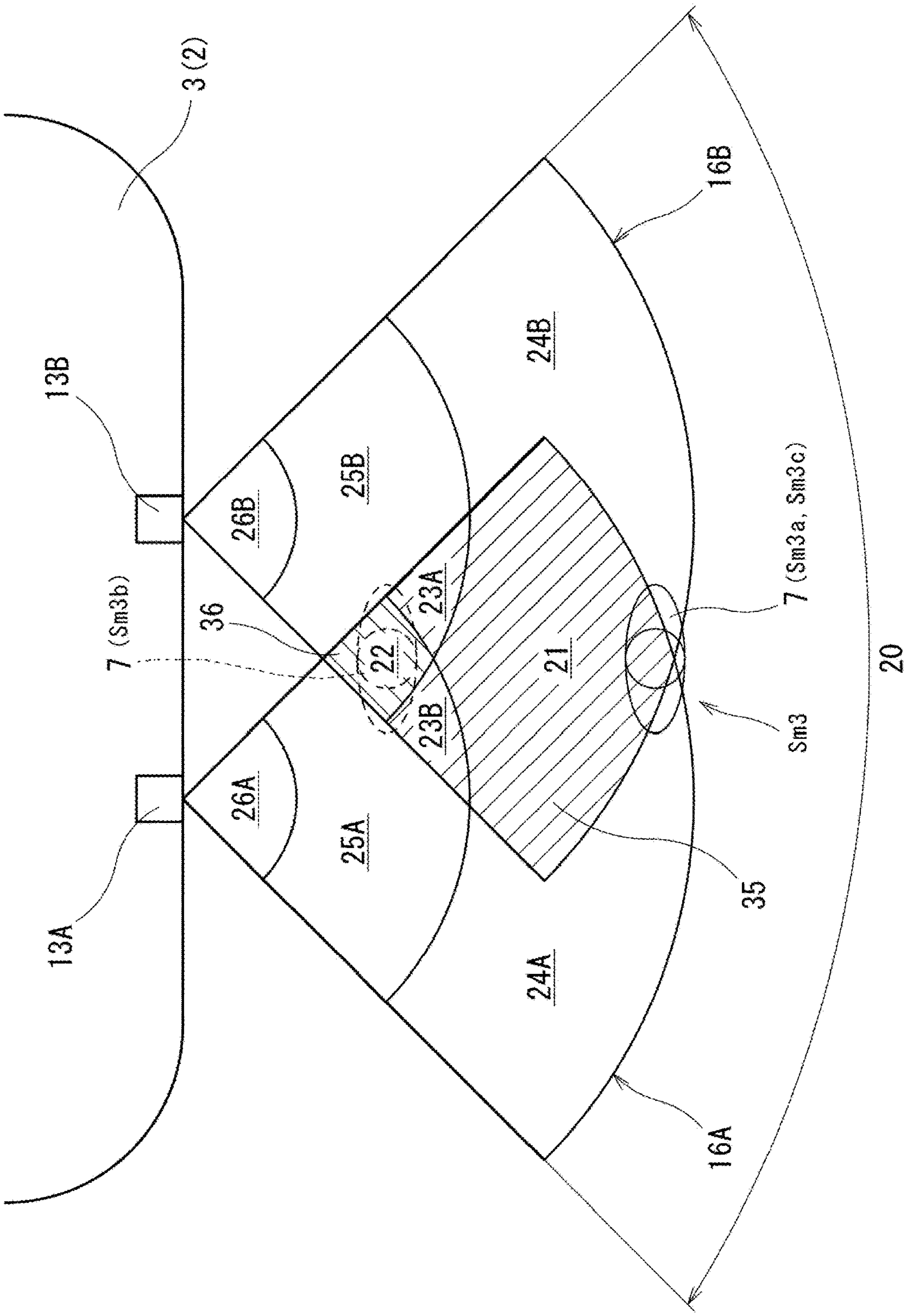

DOOR OPENING AND CLOSING APPARATUS AND DOOR OPENING AND CLOSING METHOD

CROSS-REFERENCE TO RELATED APPLICATIONS

This is a national phase application in the United States of International Patent Application No. PCT/JP2023/000386 with an international filing date of Jan. 11, 2023, which claims benefit of priority of JP Patent Appln. No. 2022-054162 filed on Mar. 29, 2022, the contents of which are incorporated herein by reference.

TECHNICAL FIELD

The present invention relates to a door opening and closing apparatus and a door opening and closing method.

BACKGROUND ART

A door opening and closing apparatus capable of automatically opening and closing a door without a user touching the handle of the door is known. Such a door opening and closing apparatus includes a pair of detectors each including an ultrasonic sensor, and detects a user who is within a fan-shaped detection range, using ultrasonic waves emitted from the detectors. When it is determined that the user has made a predetermined setting movement, on the basis of changes in the distance of the user, the change being obtained from detection results of the pair of detectors, a driving unit is caused to open or to close the door.

JP 2020-180523 A discloses a door opening and closing apparatus configured to determine an entry position of a user on the basis of detection results of a pair of detectors, to set a mode to one of a side access mode or a center access mode, and to open or to close the door upon detecting a setting movement. In the side access mode, a user's movement in a direction in parallel with the door is detected as the setting movement, on the basis of a detection result of one of the pair of detectors. In the center access mode, a user's movement in a direction intersecting with the door is detected as the setting movement, on the basis of the detection result of each of the pair of detectors.

SUMMARY OF THE INVENTION

Problems to be Solved by the Invention

Because a detector has a fan-shaped detection range gradually spreading away from the detector, the range where a user is detectable near the door is small. Therefore, in the side access mode, it is difficult ensure the area (distance) for allowing user to make the setting movement. In this regard, the door opening and closing apparatus according to JP 2020-180523 A has room for improvement in operability.

An object of the present invention is to provide a door opening and closing apparatus and a door opening and closing method capable of ensuring an area for allowing a user to make a setting movement along a door, and improving operability in opening and closing the door.

Solutions to the Problem

According to the present invention, there provided is a door opening and closing apparatus including: a driving unit configured to open and to close a door with respect to a vehicle body; a first detector configured to repeatedly detect a detection target that is present within a first detection range set around the door; a second detector disposed spaced apart from the first detector in a horizontal direction and configured to repeatedly detect the detection target that is present within a second detection range set around the door in a manner partially overlapping with the first detection range; a measurement unit configured to measure a first distance from the first detector to the detection target based on a detection result of the first detector, and to measure a second distance from the second detector to the detection target based on a detection result of the second detector; a setting unit configured to set at least a part of one of the first detection range and the second detection range as a first zone in which a first phase of a setting movement of the detection target is to be detected, and to set a part of another one of the first detection range and the second detection range as a second zone in which a second phase of the setting movement is to be detected, based on the first distance and the second distance measured by the measurement unit; and a control unit configured to cause the driving unit to open or to close the door upon determining that the detection target has performed the setting movement including a movement between the first zone and the second zone, based on a change in the first distance and a change in the second distance measured by the measurement unit.

The door opening and closing apparatus includes the setting unit configured to set at least a part of one of the first detection range and the second detection range as the first zone in which the first phase of the setting movement is to be detected, and to set a part of another one of the first detection range and the second detection range as the second zone in which the second phase of the setting movement is to be detected, based on the first distance and the second distance measured by the measurement unit.

Therefore, as compared with a configuration in which the first zone and the second zone are set within the detection range of one of the first detector and the second detector, it is possible to ensure an area for allowing a user to make the setting movement. Hence, the operability for the user in opening and closing the door can be improved.

Effects of the Invention

With the door opening and closing apparatus according to the present invention, it is possible to ensure an area for allowing a user to make a setting movement along a door, and to improve the operability in opening and closing the door.

BRIEF DESCRIPTION OF THE DRAWINGS

FIG. 6 is a table showing mode settings that are based on a detection target detected by a first detector and a second detector, and the positions of the detection target with respect to the door.

FIG. 7 is a plan view showing a start zone and a trigger zone in a left access mode.

FIG. 8 is a plan view showing a start zone and a trigger zone in a right access mode.

FIG. 9 is a plan view showing a start zone and a trigger zone in a center access mode.

DETAILED DESCRIPTION

An embodiment of the present invention will now be explained with reference to drawings.

Figure 1:
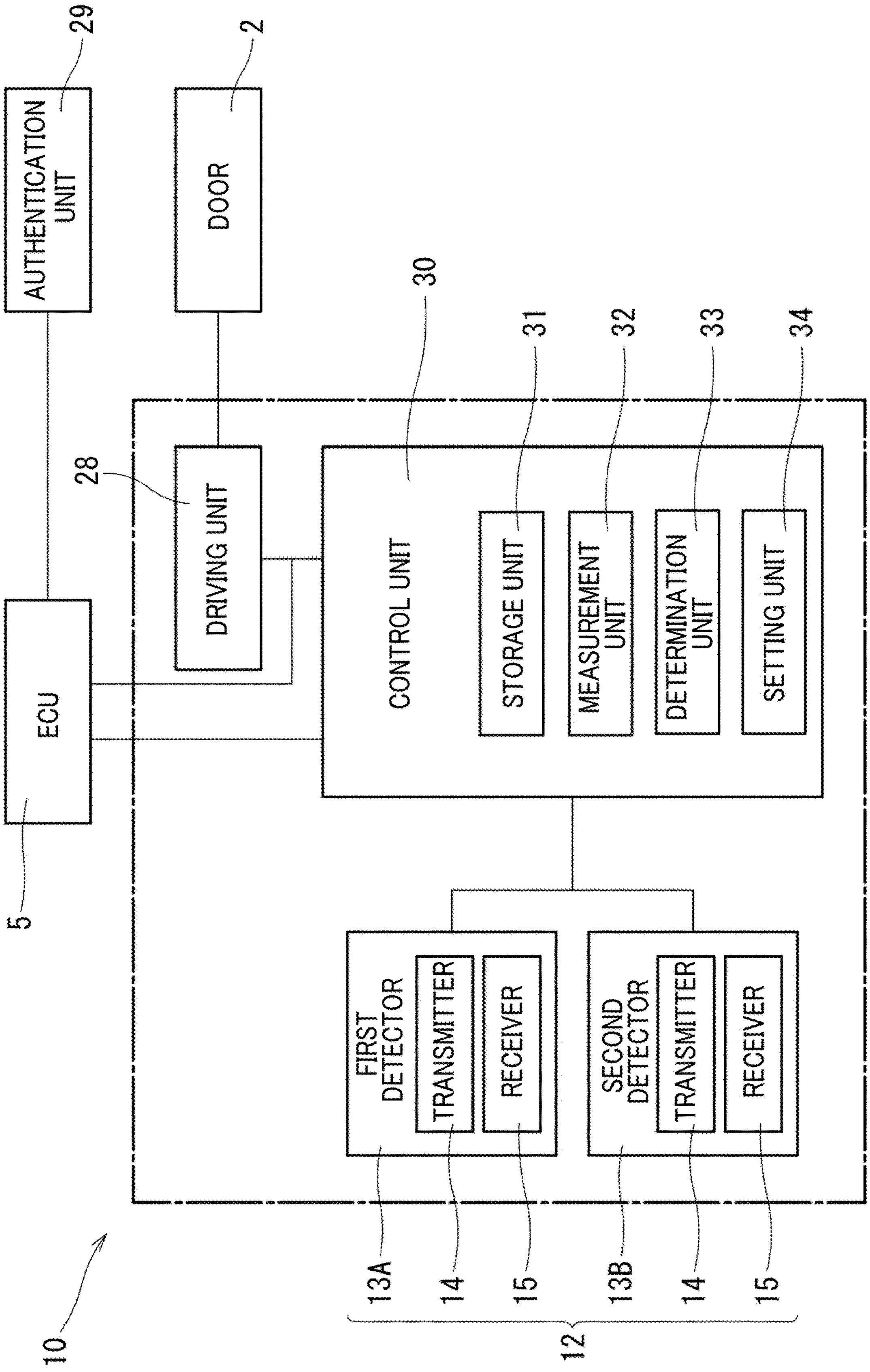
FIG. 1 is a block diagram of a door opening and closing apparatus according to an embodiment of the present invention.
Figure 2:
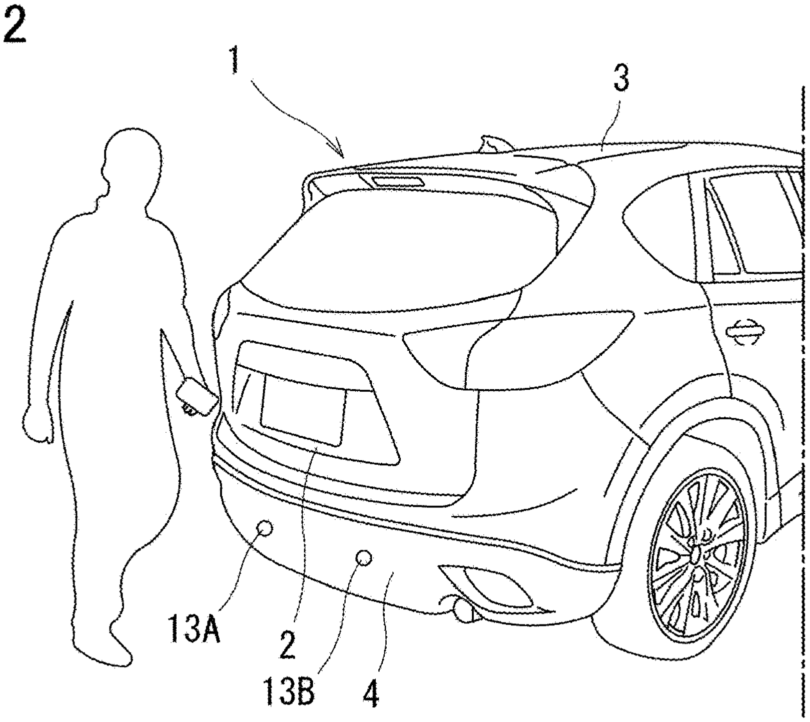
FIG. 2 is a perspective view showing the door having been closed.
Figure 3:
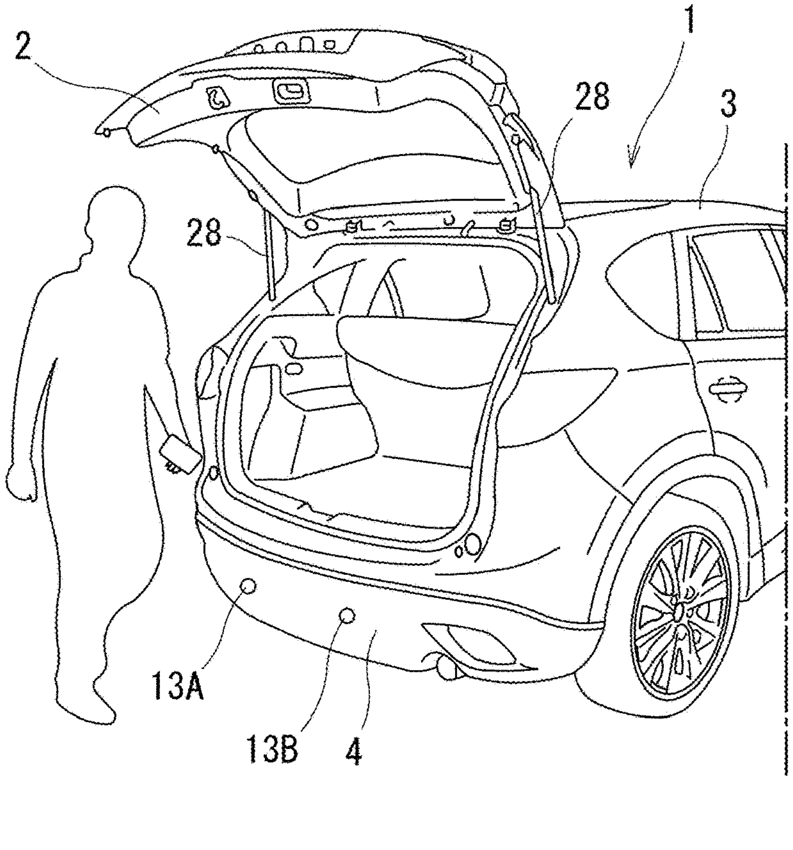
FIG. 3 is a perspective view showing the door having been opened.

Referring to FIGS. 1 to 3, a door opening and closing apparatus 10 for a vehicle according to an embodiment of the present invention is configured to automatically open or close a door 2 without the user using his/her hand, in response to a user making one of predetermined setting movements Sm1, Sm2, Sm3 (see FIGS. 7, 8, and 9, respectively) in front of the door 2 of the vehicle 1. In the present embodiment, the door 2 to be controlled is a hatchback door. However, the door 2 to be controlled may be any door other than a hatchback door.

Referring to FIG. 1, the door opening and closing apparatus 10 includes a detection unit 12, a driving unit 28, an authentication unit 29, and a control unit 30. In FIG. 1, the part surrounded by a one-dot chain line represents newly added configurations, and, for the authentication unit 29, an existing component mounted on the vehicle 1 is used. If the vehicle 1 is equipped with back sonar sensors for monitoring the rear side of the vehicle 1 during driving, the existing components may be used as the detection unit 12. If the vehicle 1 is equipped with a remote-controlled automatic door enabled to automatically open and close the door 2, with the use of a key (portable device), the existing components may be used as the driving unit 28.

The detection unit 12 includes two detectors 13A, 13B, and is configured to detect a moving object including a user and a third party other than the user, and an immovable object such as a wall that is an obstacle. Such moving objects and immovable objects are detection targets 7 according to the present invention.

Figure 4:
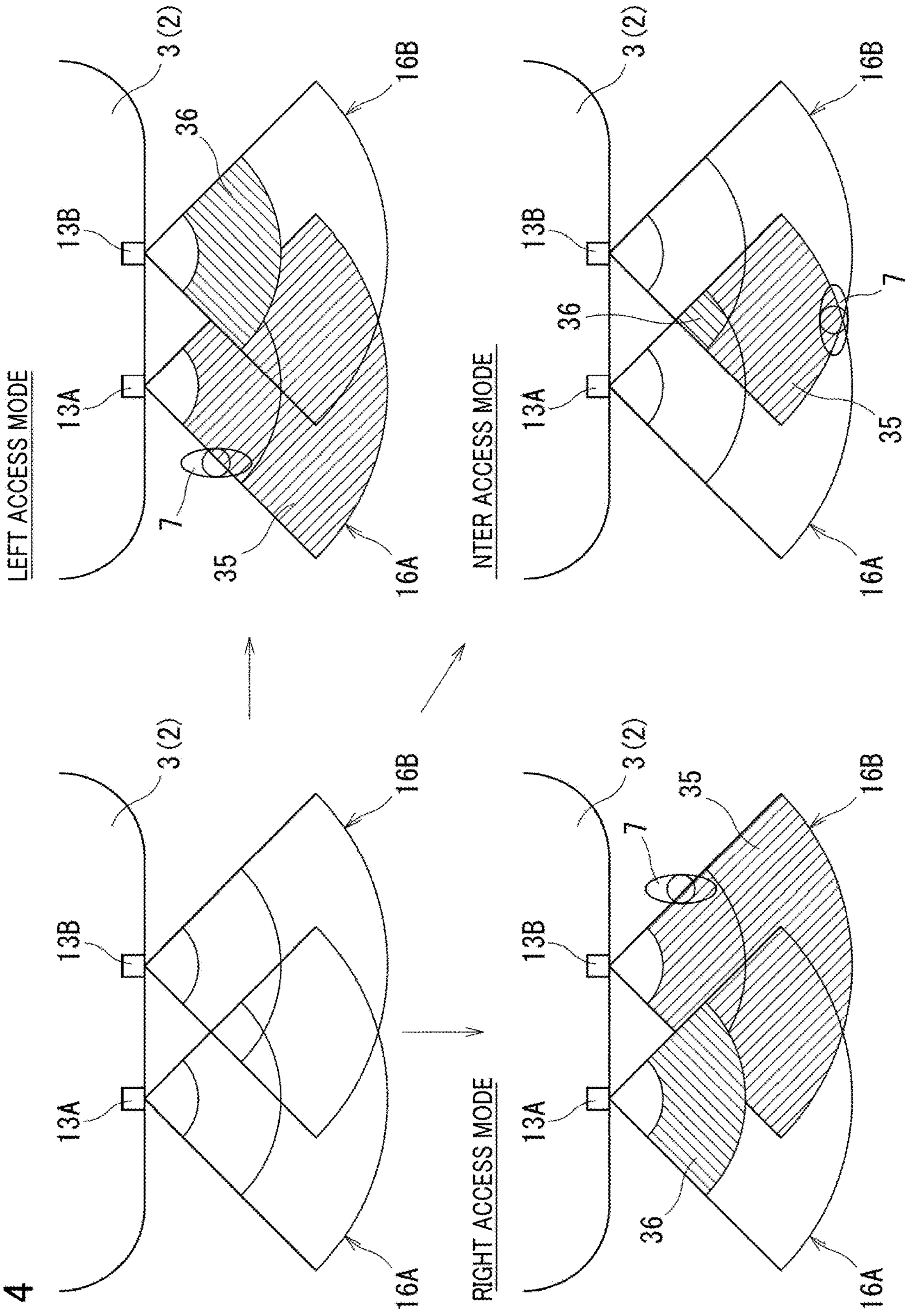
FIG. 4 is a plan view providing a summary of mode settings with respect to a first detection range and a second detection range.

Referring to FIG. 1, the control unit 30 includes a storage unit 31, a measurement unit 32 configured to measure the distance from each of the detectors 13A, 13B to a detection target 7, a determination unit 33 configured to determine whether the detection target 7 is a moving object or an immovable object, and a setting unit 34 configured to carry out mode setting. Referring to FIG. 4, the setting unit 34 carries out mode setting to any one of a left access mode (first access mode), a right access mode (second access mode), and a center access mode (third access mode) on the basis of the position of the detection target 7 detected earliest, with respect to the door 2. Each of these modes uses a start zone (first zone) 35 and a trigger zone (second zone) 36 that are allocated differently among the modes. The control unit 30 detects a movement of an object having been determined as a moving object by the determination unit 33, on the basis of a change in distances Md1, Md2 measured by the measurement unit 32. If it is determined that the movement of the moving object constitutes any one of setting movements Sm1, Sm2, Sm3 (see FIGS. 7, 8, and 9, respectively) specified by the setting unit 34, the setting movements each including a movement between the start zone 35 and the trigger zone 36, the driving unit 28 is caused to open or to close the door 2.

Referring to FIGS. 7 to 9, a series (a plurality of phases) of forward and rearward movements is established as each of the setting movements Sm1, Sm2, Sm3, and different series of movements are set for the left access mode, the right access mode, and the center access mode, respectively. Referring to FIG. 7, the first setting movement Sm1 is for the left access mode used when the detection target 7 approaches the door 2 from the left side of the vehicle body 3, and is specified as a series of movements of the detection target 7 moving ahead toward the right side along the door 2, and then moving back to the left side (Sm1*a*→Sm1*b*→Sm1*c*). Referring to FIG. 8, the second setting movement Sm2 is for the right access mode in which the user approaches the door 2 from the right side of the vehicle body 3, and is specified as a series of user movements of moving ahead toward the left side along the door 2 and then moving back to the right side (Sm2*a*→Sm2*b*→Sm2*c*). Referring to FIG. 9, the third setting movement Sm3 is for the center access mode in which the user approaches the door 2 from the rear side of the vehicle body 3, and is specified as a series of user movements of moving ahead toward the door 2 and then moving back away from the door 2 (Sm3*a*→Sm3*b*→Sm3*c*). Note that these setting movements Sm1, Sm2, Sm3 may be any movements other than a series of forward and rearward movements.

The detection unit 12, the driving unit 28, the authentication unit 29, and the control unit 30 will now be described specifically.

Referring to FIGS. 1 to 4, the detection unit 12 includes two detectors 13A, 13B mounted on the rear bumper 4 of the vehicle body 3 in a manner interspaced from each other in the vehicle width direction (horizontal direction) along the door 2. The detectors 13A, 13B detect the detection target 7 within respective predetermined detection ranges 16A, 16B, repeatedly, at every set time interval (e.g., 80 msec). In the description hereunder, the detector on the left side in a view from the direction directly facing the door 2 will be sometimes referred to as a first detector 13A, and the detector on the right side in a view from the direction directly facing the door 2 will be sometimes referred to as a second detector 13B.

Referring to FIG. 1, each of the detectors 13A, 13B is an ultrasonic sensor including a transmitter 14 and a receiver 15, and is communicably connected to the control unit 30 by a communication cable.

Figure 5:
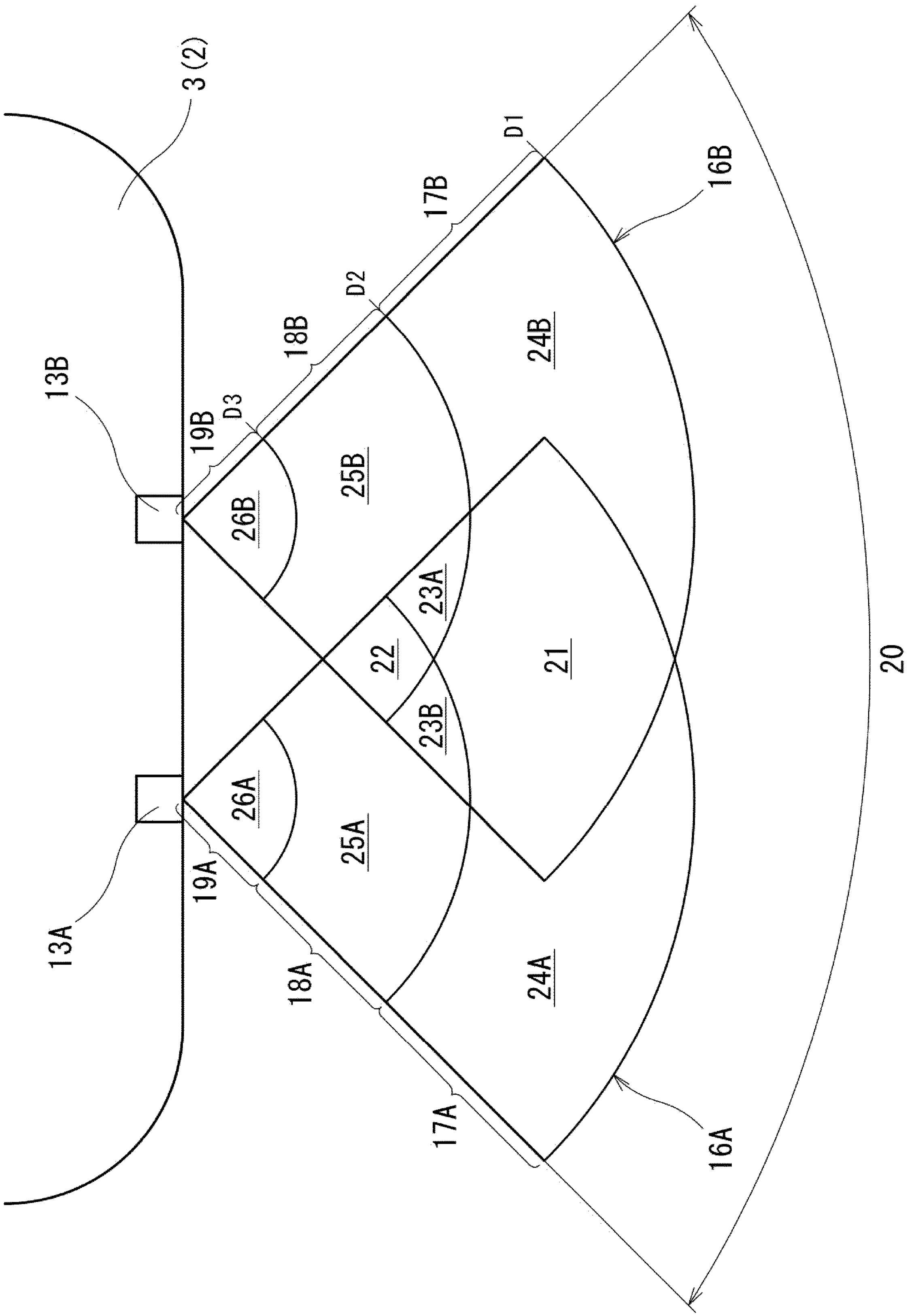
FIG. 5 is a plan view showing the first detection range and the second detection range.

Referring to FIG. 5, the ultrasonic waves emitted from the transmitters 14 of the detectors 13A, 13B form detection ranges 16A, 16B, respectively, spreading rearwards from the door 2 in a substantially conical shape. On the ground, each of the detection ranges 16A, 16B spreads in a fan-like shape (e.g., with a center angle of about 90 degrees). The detection central axis (not shown) of each of the detection ranges 16A, 16B extends rearwards, in parallel with the vehicle length direction. The detection ranges 16A, 16B partially overlap each other. In the description hereunder, the detection range of the first detector 13A will be sometimes referred to as a first detection range 16A, and the detection range of the second detector 13B will be sometimes referred to as a second detection range 16B.

The receiver 15 receives waves that are reflections of the ultrasonic waves transmitted from the transmitter 14. The receiver 15 outputs the detection result to the control unit 30. This detection result is used in calculating the distance to the detection target 7, in calculating the speed of the movement of the detection target 7, and also in determining the presence of a detection target 7 in the detection ranges 16A, 16B. It is also possible for the detectors 13A, 13B to be communicably connected to an electronic control unit (ECU) 5 (see FIG. 1) of the vehicle 1, and for the ECU 5 to input the detection results from the detectors 13A, 13B to the control unit 30.

The detection ranges 16A, 16B corresponding to the respective detectors 13A, 13B will now be described more specifically with reference to FIG. 5.

The detection ranges 16A, 16B are set as regions within a specified distance D1 (e.g., 900 mm) from the respective detectors 13A, 13B. The entire region with the first detection range 16A and the second detection range 16B combined together form an approach region 20 for starting the detection of the setting movements Sm1, Sm2, Sm3 when a moving object moves thereinto.

Each of the detection ranges 16A, 16B is divided into a first section 17A, 17B, a second section 18A, 18B, and a third section 19A, 19B, based on the distances D1, D2, D3 from the detector 13A, 13B corresponding thereto. These sections are electrically defined by the setting unit 34 for the purpose of identifying the position of the detection target 7 within the approach region 20. The specified distance D2 is shorter than the specified distance D1 (e.g., 500 mm), and the specified distance D3 is shorter than the specified distance D2 (e.g., 200 mm). The section between the specified distances D1 and D2 corresponds to the first section (first portion 17A, 17B); the section between the specified distances D2 and D3 corresponds to the second section (second portion) 18A, 18B; and the section between the specified distance D3 and the detector 13A, 13B corresponds to the third section (third portion) 19A, 19B. The first sections 17A, 17B partially overlap each other, and the second sections 18A, 18B also partially overlap each other. In other words, the distances D2, D3 are set so that the sections overlap with each other in the manner described above. In this embodiment, there is no overlap between the third sections 19A, 19B. However, it is also possible to set the distance D3 in such a manner that the third sections 19A, 19B partially overlap each other.

The approach region 20 formed by the detection ranges 16A, 16B thus divided includes three types of overlapping regions 21, 22, and 23A and 23B, and three types of non-overlapping regions 24A and 24B, 25A and 25B, and 26A and 26B. The detection target 7 in the overlapping region 21, 22, 23A or 23B is detected by both the first detector 13A and the second detector 13B. The detection target 7 in the non-overlapping regions 24A, 25A, or 26A is detected by the first detector 13A but not by the second detector 13B. The detection target 7 in the non-overlapping region 24B, 25B, or 26B is detected by the second detector 13B but not by the first detector 13A.

The first overlapping region 21 is a region where the first section 17A of the first detection range 16A and the first section 17B of the second detection range 16B overlap each other.

The second overlapping region 22 is a region where the second section 18A of the first detection range 16A and the second section 18B of the second detection range 16B overlap each other. The second overlapping region 22 is adjacent to the first overlapping region 21 on the side nearer to the vehicle body 3.

The third overlapping region 23A is a region where the first section 17A of the first detection range 16A and the second section 18B of the second detection range 16B overlap each other. The third overlapping region 23B is a region where the second section 18A of the first detection range 16A and the first section 17B of the second detection range 16B overlap each other. In FIG. 5, the third overlapping region 23A is adjacent to the overlapping regions 21 and 22 on the right side of the overlapping regions 21 and 22, and the third overlapping region 23B is adjacent to the overlapping regions 21 and 22 on the left side of the overlapping regions 21 and 22.

The first non-overlapping region 24A is a region corresponding to the first section 17A of the first detection range 16A excluding the part overlapping with the second detection range 16B. The first non-overlapping region 24B is a region corresponding to the first section 17B of the second detection range 16B excluding the part overlapping with the first detection range 16A. In FIG. 5, the first non-overlapping region 24A is adjacent to the first overlapping region 21 on the left side of the first overlapping region 21, and the first non-overlapping region 24B is adjacent to the first overlapping region 21 on the right side of the first overlapping region 21.

The second non-overlapping region 25A is a region corresponding to the second section 18A of the first detection range 16A excluding the part overlapping with the second detection range 16B. The second non-overlapping region 25B is a region corresponding to the second section 18B of the second detection range 16B excluding the part overlapping with the first detection range 16A. In FIG. 5, the second non-overlapping region 25A is adjacent to the first non-overlapping region 24A on the side nearer to the vehicle body 3, and adjacent to the overlapping regions 22 and 23B on the left side of the overlapping regions 22 and 23B; and the second non-overlapping region 25B is adjacent to the first non-overlapping region 24B on the side nearer to the vehicle body 3, and adjacent to the overlapping regions 22 and 23A on the right side of the overlapping regions 22 and 23A.

The third non-overlapping region 26A corresponds to the third section 19A of the first detection range 16A. The third non-overlapping region 26B corresponds to the third section 19B of the second detection range 16B. In FIG. 5, the third non-overlapping region 26A is adjacent to the second non-overlapping region 25A on the side nearer to the vehicle body 3, and the third non-overlapping region 26B is adjacent to the second non-overlapping region 25B on the side nearer to the vehicle body 3.

Referring to FIGS. 1 to 3, the driving unit 28 is disposed between the vehicle body 3 and the door 2, and is configured to open or to close the door 2 by being driven by the control unit 30 that is electrically connected thereto. Although the configuration of the driving unit 28 is not specifically shown, the driving unit 28 includes a motor, a gear mechanism, and a damper by which the door 2 can be rotated in the directions to open and to close. Note that the driving unit 28 may also be electrically connected to the ECU 5, and the control unit 30 may drive the driving unit 28 via the ECU 5.

The authentication unit 29 includes a transceiver having an external low-frequency (LF) transmission/reception antenna via which the authentication unit 29 communicates with a key using an LF signal, and is configured to authenticate a key outside the vehicle and to determine whether the moving object is the user (authentication processing). The transceiver is communicably connected to the ECU 5 by a communication cable, and is activated in response to a command issued by the ECU 5 and performs communication related to the authentication processing. In the authentication processing, the authentication unit 29 requests transmission of an authentication code from the key, and compares the authentication code received from the key with a registered authorized code. When the authentication code matches the authorized code (authentication succeeds), the ECU 5 electrically connected to the authentication unit 29 determines that the moving object is the user, and permits the driving unit 28 to open and to close the door 2. When the authentication code does not match the authorized code (authentication fails), the ECU 5 electrically connected to the authentication unit 29 determines that the moving object is a third party, and disables the opening and closing operation of the door 2 by the driving unit 28. To disable herein means not to drive the driving unit 28, for example, by interrupting a driving signal output from the control unit 30 so that the driving signal is not input to the driving unit 28.

Referring to FIG. 1, the control unit 30 is communicably connected to the detection unit 12, and is electrically connected to the driving unit 28. The control unit 30 is communicably or electrically connected to the ECU 5. The control unit 30 includes the storage unit 31, the measurement unit 32, the determination unit 33, and the setting unit 34, and is implemented by one or more microcomputers and other electronic devices. Note that each of the storage unit 31, the measurement unit 32, the determination unit 33, and the setting unit 34 may be implemented as a microcomputer and other electronic devices that are different from those of the control unit 30.

The storage unit 31 stores therein a control program, setting data such as a threshold and a determination value used in the control program, and a data table for calculating a distance from detection results of the detectors 13A, 13B, for example. The storage unit 31 also stores therein the measurement distances Md1, Md2 measured by the measurement unit 32. In the present embodiment, the storage unit 31 is capable of storing ten measurement distances Md1*a*, Md2*a* to Md1*j*, Md2*j*. When the latest measurement distances Md1, Md2 are to be stored additionally to the ten measurements in the storage unit 31, the oldest measurement distances Md1*j*, Md2*j* are erased.

The measurement unit 32 measures the first distance Md1 between the first detector 13A and the detection target 7 on the basis of the time (detection result) from when the transmitter 14 in the first detector 13A has transmitted an ultrasonic wave to when the receiver 15 in the first detector 13A receives the reflected wave. The second distance Md2 between the second detector 13B and the detection target 7 is measured on the basis of the time from when the transmitter 14 in the second detector 13B has transmitted an ultrasonic wave to when the receiver 15 in the second detector 13B receives the reflected wave. In other words, the measurement unit 32 and the detectors 13A, 13B together form two distance measuring sensors configured to measure the distance from each of the detectors 13A, 13B to the detection target 7. When there are two or more detection targets 7 at different positions in the detection ranges 16A, 16B, the same number of measurements are collected by the detectors 13A, 13B as the number of the detection targets 7, but the measurement unit 32 calculates the distances Md1, Md2 with respect to the detection target 7 on the basis of the detection result having been received earliest. In other words, a first detection target 7 detected by the first detector 13A and a second detection target 7 detected by the second detector 13B may be the same object or different objects. The measurement distances Md1, Md2 are stored in the storage unit 31.

The determination unit 33 determines whether the detection target 7 detected by each of the detectors 13A, 13B is a moving object or an immovable object. Specifically, the determination unit 33 calculates the speed Ms1 at which the detection target (first detection target) 7 detected by the first detector 13A moves, on the basis of the latest first measurement distance Md1 and the previous first measurement distance Md1*a* stored in the storage unit 31. The moving speed Ms1 is then compared with a predetermined determination value (set speed) Jv (e.g., 20 mm/s). If the moving speed Ms1 is higher than or equal to the determination value Jv, it is determined that the detection target 7 is a moving object. If the moving speed Ms1 is lower than the determination value Jv, it is determined that the detection target 7 is an immovable object. The determination unit 33 also calculates the speed Ms2 at which the detection target (second detection target) 7 detected by the second detector 13B moves, on the basis of the latest second measurement distance Md2 and the previous second measurement distance Md2*a* stored in the storage unit 31. The moving speed Ms2 is then compared with the predetermined determination value Jv. If the moving speed Ms2 is higher than or equal to the determination value Jv, it is determined that the detection target 7 is a moving object. If the moving speed Ms2 is lower than the determination value Jv, it is determined that the detection target 7 is an immovable object.

If the differences (amounts of change) between the current measurement distances Md1, Md2 and the respective last measurement distances Md1*a*, Md2*a* are large, the detection targets 7 have moved a long distance at high moving speeds Ms1, Ms2. If the amount of the change is small, the detection targets 7 have moved a short distance, at low moving speeds Ms1, Ms2. Therefore, the determination unit 33 can determine whether the detection target 7 detected by the first detector 13A is a moving object or an immovable object using a change in the first measurement distances Md1, and can determine whether the detection target 7 detected by the second detector 13B is a moving object or an immovable object using the change in the second measurement distances Md2. Although the determination unit 33 may determine whether the object is a moving object or an immovable object only by performing the comparison once, it is preferable for the determination unit 33 to make a final determination when the same comparison result is obtained successively for a predetermined number of times (e.g., eight times=640 msec). Note that it is also possible to use the gradient of the average of the detection results (the rate of change in the distance) across a predetermined number of times, as the moving speed Ms1, Ms2.

Referring to FIG. 4, the setting unit 34 carries out the mode setting to any one of the left access mode, the right access mode, and the center access mode on the basis of the detected position of the detection target 7 with respect to the door 2. Each of these modes is specified with a start zone 35 in which a first phase Sm1*a*, Sm2*a*, Sm3*a* of corresponding one of the setting movements Sm1, Sm2, and Sm3 shown in FIGS. 7, 8, and 9 is to be detected, and a trigger zone 36 in which a second phase Sm1*b*, Sm2*b*, Sm3*b* of the setting movement Sm1, Sm2, Sm3 is to be detected. The start zone 35 and the trigger zone 36 are allocated differently among the access modes.

Specifically, as shown in FIG. 6, when the determination unit 33 determines that the detection target 7 detected by the first detector 13A is a moving object and the detection target 7 detected by the second detector 13B is an immovable object, the setting unit 34 sets the left access mode shown in FIG. 7. When the determination unit 33 determines that the detection target 7 detected by the first detector 13A is an immovable object and the detection target 7 detected by the second detector 13B is a moving object, the setting unit 34 sets the right access mode shown in FIG. 8.

When the determination unit 33 determines that both of the detection target 7 detected by the first detector 13A and the detection target 7 detected by the second detector 13B are moving objects, the setting unit 34 sets the mode on the basis of a difference (Md1-Md2) between the first measurement distance Md1 and the second measurement distance Md2, measured by the measurement unit 32, and a preset setting range Sr. For example, a lower bound Sr1 of the setting range Sr is −100 mm, and an upper bound Sr2 of the setting range Sr is +100 mm. In other words, on the basis of whether the difference between the measurement distances Md1, Md2 is greater than or equal to the lower bound Sr1 and smaller than or equal to the upper bound Sr2, the setting unit 34 carries out mode setting to any one of the left access mode, the right access mode, and the center access mode.

When the difference (Md1-Md2) between the measurement distances Md1, Md2 falls outside of the setting range Sr, and the second measurement distance Md2 is greater than the first measurement distance Md1, that is, when the detection target 7 is on the side nearer to the first detector 13A, the setting unit 34 carries out mode setting to the left access mode. When the difference (Md1-Md2) between the measurement distances Md1, Md2 falls outside the setting range Sr, and the second measurement distance Md2 is shorter than the first measurement distance Md1, that is, when the detection target 7 is on the side nearer to the second detector 13B, the setting unit 34 carries out mode setting to the right access mode. When the difference (Md1-Md2) between the measurement distances Md1, Md2 falls within the setting range Sr, that is, when the detection target 7 is near the center of the door 2, the setting unit 34 carries out mode setting to the center access mode.

By contrast, when the determination unit 33 determines that both the detection target 7 detected by the first detector 13A and the detection target 7 detected by the second detector 13B are immovable objects, the setting unit 34 maintains the current mode setting having been set previously, without changing the mode to any one of the left access mode, the right access mode, and the center access mode.

Referring to FIGS. 5 and 7, in the left access mode, the setting unit 34 sets the overlapping regions 21, 23B and the non-overlapping regions 24A, 25A, 26A as the start zone 35, and sets the overlapping regions 22, 23A and the non-overlapping region 25B as the trigger zone 36. The non-overlapping regions 24B and 26B are set neither as the start zone 35 nor as the trigger zone 36.

That is, in the left access mode, the setting unit 34 sets the first detection range 16A (sections 17A to 19A) other than the overlapping regions 22, 23A overlapping with the second sections 18B of the second detection range 16B as the start zone 35, and sets the second section 18B of the second detection range 16B as the trigger zone 36. In other words, in the left access mode, the setting unit 34 sets a part of the first detection range 16A as the start zone 35, and a part of the second detection range 16B as the trigger zone 36. Note that it is also possible to set the entire first detection range 16A as the start zone 35, and to set the second section 18B of the second detection range 16B other than the overlapping regions 22, 23A as the trigger zone 36. The third section 19A (non-overlapping region 26A) that is too close to the detector 13A and can cause an erroneous detection may be excluded from the start zone 35. Furthermore, it is also possible to change whether to include the non-overlapping region 26A in the start zone 35, depending on the paragraph Sm1*a* to Sm1*c* in the setting movement Sm1.

Referring to FIGS. 5 and 8, in the right access mode, the setting unit 34 sets the overlapping regions 21, 23A and the non-overlapping regions 24B, 25B, 26B as the start zone 35, and sets the overlapping regions 22, 23B and the non-overlapping region 25A as the trigger zone 36. The non-overlapping regions 24A and 26A are set neither as the start zone 35 nor as the trigger zone 36.

That is, in the right access mode, the setting unit 34 sets the second detection range 16B (sections 17B to 19B) other than the overlapping regions 22, 23B overlapping with the second section 18A of the first detection range 16A as the start zone 35, and sets the second section 18A of the first detection range 16A as the trigger zone 36. In other words, in the right access mode, the setting unit 34 sets a part of the second detection range 16B as the start zone 35, and a part of the first detection range 16A as the trigger zone 36. Note that it is also possible to set the entire second detection range 16B as the start zone 35, and to set the second section 18A of the first detection range 16A other than the overlapping regions 22, 23B as the trigger zone 36. The third section 19B (non-overlapping region 26B) that is too close to the detector 13B and can cause an erroneous detection may be excluded from the start zone 35. Furthermore, it is also possible to change whether to include the non-overlapping region 26B in the start zone 35, depending on the paragraph Sm2*a* to Sm2*c* in the setting movement Sm2.

As described above, when a moving object makes an entry along the door 2 from one side of the vehicle body 3, the setting unit 34 sets a part of one of the detection ranges 16A and 16B as the start zone 35, and sets a part of the other one of the detection ranges 16A and 16B as the trigger zone 36. Therefore, it is possible to ensure a large area for the start zone 35 in which the first phase Sm1*a*, Sm2*a* of the setting movement Sm1, Sm2 is to be detected. Hence, it is possible to ensure a distance to the trigger zone 36 in which the second phase Sm1*b*, Sm2*b* of the setting movements Sm1, Sm2 is to be detected. If the area of the start zone 35 is small, only a short distance can be ensured to the trigger zone 36, and therefore, there is a chance that, by the time at which the setting unit 34 finishes the mode setting, the moving object has already moved into the trigger zone 36. By contrast, in this embodiment, because a large area can be ensured for the start zone 35, it is possible to suppress such shortcomings.

Referring to FIGS. 5 and 9, in the center access mode, the setting unit 34 sets the overlapping regions 21, 23A, 23B as the start zone 35, and sets the overlapping region 22 as the trigger zone 36. The non-overlapping regions 24A, 24B to 26A, and 26B are set neither as the start zone 35 nor as the trigger zone 36.

That is, in the center access mode, among the regions where the first detection range 16A and the second detection range 16B overlap each other, the setting unit 34 sets the regions 21, 23A, 23B other than the overlapping region 22 where the second sections 18A and 18B overlap each other, as the start zone 35, and sets the overlapping region 22 where the second sections 18A and 18B overlap each other as the trigger zone 36. Note that it is also possible not to set the overlapping regions 23A and 23B either as the start zone 35 or as the trigger zone 36. As described above, in the center access mode, the setting unit 34 sets a part of the overlapping region where the first detection range 16A and the second detection range 16B overlap each other, the part being farther away from the door 2, as the start zone 35, and sets a part nearer to the door 2 than the start zone 35 as the trigger zone 36.

When the vehicle 1 is parked and the engine is stopped, the control unit 30 causes the detectors 13A, 13B to start detecting the detection target 7, and performs control for automatically opening or closing the door 2. When the control unit 30 determines that the detection target 7 that is a moving object has made any one of the setting movements Sm1, Sm2, Sm3 on the basis of the changes in the measurement distances Md1, Md2 obtained from the detection results of the detectors 13A, 13B, that is, on the basis of changes in the position of the moving object determined by the determination unit 33, the control unit 30 outputs a driving signal for causing the driving unit 28 to open or to close the door 2. The control unit 30 makes the determination as to whether the movement constitutes a setting movement Sm1, Sm2, Sm3, without using the measurement distances Md1, Md2 of the detection target 7 having been determined as an immovable object by the determination unit 33.

Referring to FIG. 7, the setting movement Sm1 for the left access mode is set to a series of movements in which the moving object moves from the start zone 35 (the regions 21, 23B, 24A, 25A, 26A) denoted as Sm1*a* to the trigger zone 36 (the regions 22, 23A, 25B) denoted as Sm1*b*, and returns to the start zone 35 (the regions 21, 23B, 24A, 25A, 26A) denoted as Sm1*c*. Note that, for the third phase Sm1*c* of returning to the start zone 35, it is possible for the non-overlapping region 26A not to be included in the start zone 35.

Referring to FIGS. 5 and 7, when the first measurement distance Md1 indicates that the first detection target 7 is located inside of any one of the first section 17A to the third section 19A, and the second measurement distance Md2 indicates that no second detection target 7 is detected, the control unit 30 can determine that the detection target 7 is located inside of one of the non-overlapping regions 24A to 26A. When the first measurement distance Md1 indicates that the first detection target 7 is located inside the first section 17A or the second section 18A, and the second measurement distance Md2 indicates that the second detection target 7 is located inside the first section 17B, the control unit 30 can determine that the detection target 7 is located inside of the overlapping region 21 or 23B. In these cases, the control unit 30 can determine that the detection target 7 is located inside the start zone 35 for the left access mode.

When the first measurement distance Md1 indicates that the first detection target 7 is located inside the first section 17A or the second section 18A, and the second measurement distance Md2 indicates that the second detection target 7 is located inside the second section 18B, the control unit 30 can determine that the detection target 7 is located inside the overlapping region 23A or 22. When the first measurement distance Md1 indicates that no first detection target 7 is detected, and the second measurement distance Md2 indicates that the second detection target 7 is located inside the second section 18B, the control unit 30 can determine that the detection target 7 is located inside the non-overlapping region 25B. In these cases, the control unit 30 can determine that the detection target 7 is located inside the trigger zone 36 for the left access mode.

Referring to FIG. 8, the setting movement Sm2 for the right access mode is set to a series of movements in which the moving object moves from the start zone 35 (the regions 21, 23A, 24B, 25B, 26B) denoted as Sm2*a* to the trigger zone 36 (the regions 22, 23B, 25A) denoted as Sm2*b*, and returns to the start zone 35 (the regions 21, 23A, 24B, 25B, 26B) denoted as Sm2*c*. Note that, for the third phase Sm2*c* of returning to the start zone 35, it is possible for the non-overlapping region 26B not to be included in the start zone 35.

Referring to FIGS. 5 and 8, when the first measurement distance Md1 indicates that no first detection target 7 is detected, and the second measurement distance Md2 indicates that the second detection target 7 is located inside any one of the first section 17B to the third section 19B, the control unit 30 can determine that the detection target 7 is located inside any one of the non-overlapping regions 24B to 26B. When the first measurement distance Md1 indicates that the first detection target 7 is located inside the first section 17A, and the second measurement distance Md2 indicates that the second detection target 7 is located inside the first section 17B or the second section 18B, the control unit 30 can determine that the detection target 7 is located inside the overlapping region 21 or 23A. In these cases, the control unit 30 can determine that the detection target 7 is located inside the start zone 35 for the right access mode.

When the first measurement distance Md1 indicates that the first detection target 7 is located inside the second section 18A and the second measurement distance Md2 indicates that the second detection target 7 is located inside the first section 17B or the second section 18B, the control unit 30 can determine that the detection target 7 is located inside the overlapping region 22 or 23B. When the first measurement distance Md1 indicates that the first detection target 7 is located inside the second section 18A and the second measurement distance Md2 indicates that no second detection target 7 is detected, the control unit 30 can determine that the detection target 7 is located inside the non-overlapping region 25A. In these cases, the control unit 30 can determine that the detection target 7 is located inside the trigger zone 36 for the right access mode.

Referring to FIG. 9, the setting movement Sm3 for the center access mode is set to a series of movements in which the moving object moves from the start zone 35 (the regions 21, 23A, 23B) denoted as Sm3*a* to the trigger zone 36 (the region 22) denoted as Sm3*b*, and returns to the start zone 35 (the regions 21, 23A, 23B) denoted as Sm3*c*.

Referring to FIGS. 5 and 9, when the first measurement distance Md1 indicates that the first detection target 7 is located inside the first section 17A and the second measurement distance Md2 indicates that the second detection target 7 is located inside the first section 17B, the control unit 30 can determine that the detection target 7 is located inside the overlapping region 21. When the first measurement distance Md1 indicates that the first detection target 7 is located inside the first section 17A and the second measurement distance Md2 indicates that the second detection target 7 is located inside the second section 18B, the control unit 30 can determine that the detection target 7 is located inside the overlapping region 23A. When the first measurement distance Md1 indicates that the first detection target 7 is located inside the second section 18A and the second measurement distance Md2 indicates that the second detection target 7 is located inside the first section 17B, the control unit 30 can determine that the detection target 7 is located inside the overlapping region 23B. In these cases, the control unit 30 can determine that the detection target 7 is located inside the start zone 35 for the center access mode.

When the first measurement distance Md1 indicates that the first detection target 7 is located inside the second section 18A and the second measurement distance Md2 indicates that the second detection target 7 is located inside the second section 18B, the control unit 30 can determine that the detection target 7 is located inside the overlapping region 22. In this case, the control unit 30 can determine that the detection target 7 is located inside the trigger zone 36 for the center access mode.

Figure 10:
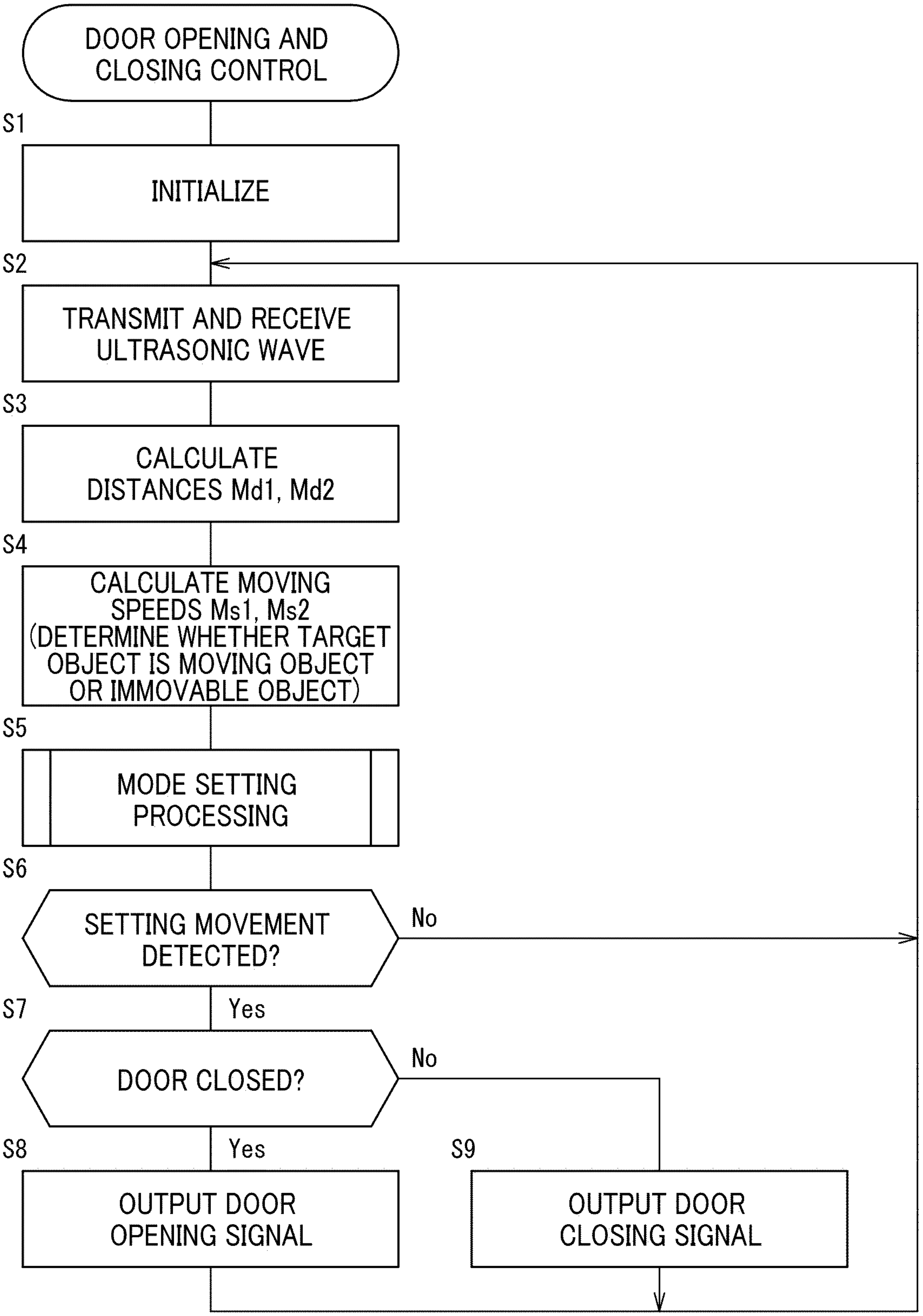
FIG. 10 is a flowchart showing main control of a control unit.

Next, control of the door opening and closing apparatus 10 will be described with reference to a flowchart shown in FIG. 10.

Once the vehicle 1 is parked and the engine is stopped, the control unit 30 causes the detectors 13A, 13B to detect the detection target 7 repeatedly at every set time interval (e.g., 80 msec) (step S2), causes the measurement unit 32 to collect the measurement distances Md1, Md2 (step S3), causes the determination unit 33 to determine whether the object is a moving object or an immovable object (step S4), causes the setting unit 34 to carry out the mode setting processing (step S5), and causes the driving unit 28 to open (step S8) or close (step S9) the door 2 when the moving object makes any one of the setting movements Sm1, Sm2, Sm3 (step S6). Note that, when the authentication by the authentication unit 29 does not succeed, the ECU 5 disables the driving of the driving unit 28.

Specifically, in step S1, the control unit 30 initializes (erases) the measurement distances Md1*a*, Md2*a* to Md1*j*, Md2*j* stored in the previous door open/close control in the storage unit 31. In step S2, the first detector 13A is then caused to transmit and to receive an ultrasonic wave, and after waiting for a certain time period for allowing the reverberation to completely disappear, the second detector 13B is then caused to transmit and to receive an ultrasonic wave. In other words, the detectors 13A, 13B causes the transmitters 14 to transmit ultrasonic waves and causes the receivers 15 to receive the reflected waves alternately, to prevent erroneous cross-detections between the detectors 13A, 13B.

In step S3, the measurement unit 32 calculates each of the distances Md1, Md2 from each of the detectors 13A, 13B to the detection target 7, on the basis of the detection results (time from the transmission to the reception) of the detectors 13A, 13B. At this time, the measurement unit 32 receives the same number of detection results as the number of detection targets 7, and the measurement unit 32 calculates the distances Md1, Md2 with respect to the detection target 7 using the detection result having received earliest.

In step S4, using the current measurement distances Md1, Md2 and the previous measurement distances Md1*a*, Md2*a* stored in the storage unit 31, the determination unit 33 calculates the moving speeds Ms1, Ms2 of the detection target 7 from the respective amounts of change. Based on the calculated moving speeds Ms1, Ms2 and the determination value Jv, the determination unit 33 determines whether each of the first detection target 7 detected by the first detector 13A and the second detection target 7 detected by the second detector 13B is a moving object or an immovable object.

In step S5, the mode setting processing is performed, and the process is shifted to step S6. The mode setting processing will be described later in detail.

In step S6, the control unit 30 detects the movement of the moving object between the start zone 35 and the trigger zone 36, on the basis of the changes in the measurement distances Md1, Md2 obtained from the detection results of the respective detectors 13A, 13B, and determines whether the movement constitutes any one of the setting movements Sm1, Sm2, Sm3. If the movement constitutes any one of the setting movements Sm1, Sm2, and Sm3, the process is shifted to step S7. If the movement constitutes none of the setting movements Sm1, Sm2, and Sm3, the process is returned to step S2. In the detection of the setting movement, if an entry of the moving object from the start zone 35 to the trigger zone 36 is determined, the result of the determination of the entry to the trigger zone is stored in the storage unit 31. This stored result is erased when a setting movement is detected.

In step S7, the control unit 30 detects whether the door 2 is closed or open. If the door 2 is closed, a driving signal for opening the door 2 is output to the driving unit 28 in step S8, and the process is returned to step S2. If the door is open, a driving signal for closing the door 2 is output to the driving unit 28 in step S9, and the process is returned to step S2.

The mode setting processing performed by the setting unit 34 in step S5 will be described with reference to FIGS. 11A and 11B.

Figure 11A:
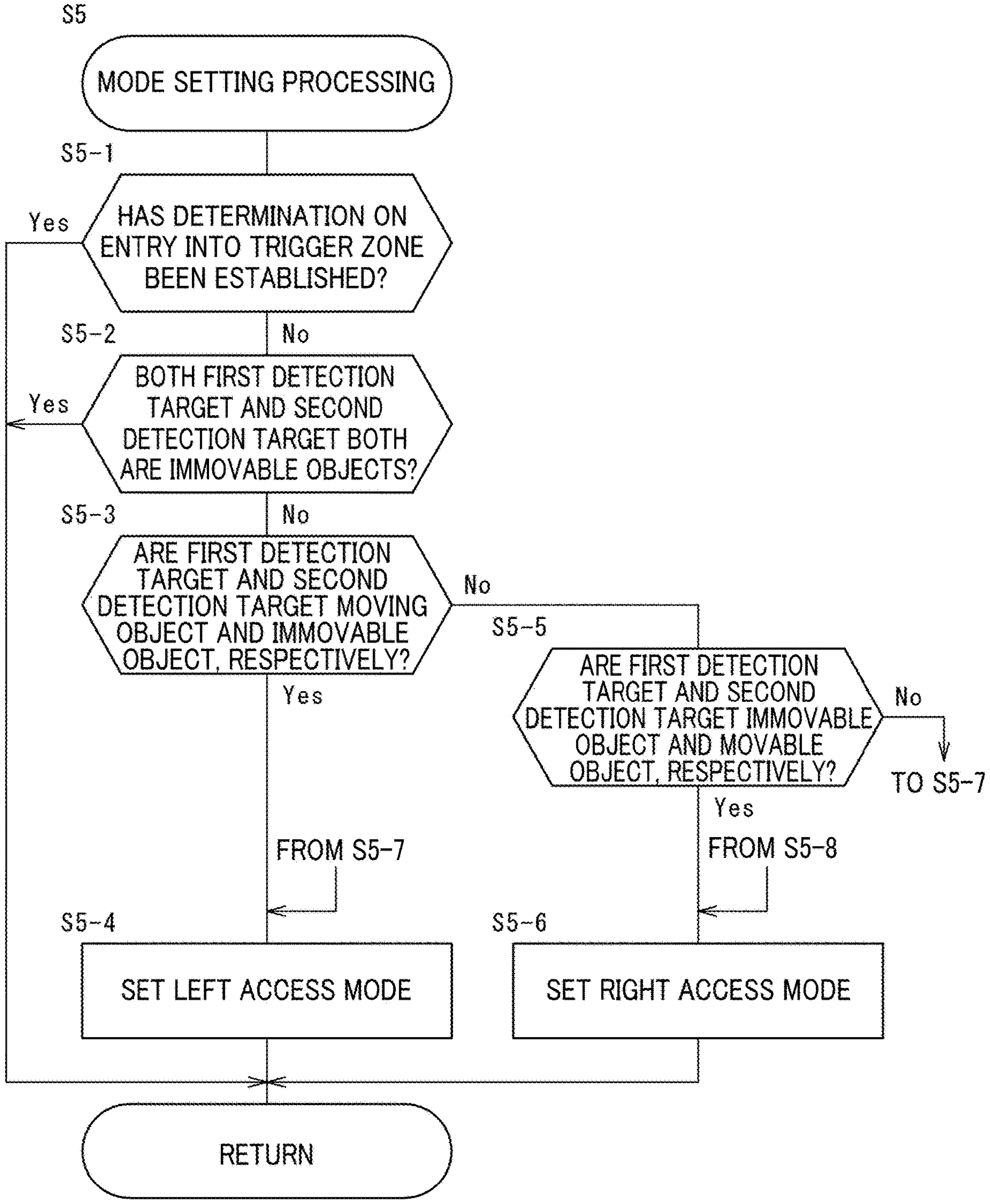
FIG. 11A is a flowchart showing mode setting processing in FIG. 10.

Referring to FIG. 11A, the setting unit 34 determines whether to change the mode setting based on the determination result of the determination unit 33, and the result of determining how the setting movement Sm1, Sm2, Sm3 has progressed, by the control unit 30. Specifically, in step S5-1, in order to avoid unintended resetting of the mode after the mode setting, the setting unit 34 reads information pertaining to whether determination of an entry of the moving object into the trigger zone 36 has been established through the setting movement detection in step S6. If a movement constituting an entry has been detected, the process is returned without performing the subsequent steps. If a movement constituting an entry has not been detected, the process is shifted to step S5-2. At this time, the time required for the user as the moving object to move from the start zone 35 to the trigger zone 36 is usually about 300 msec, assuming that a human walks at a speed of 1300 mm/see, for example. By contrast, when the determination unit 33 is configured to finalize the determination of whether an object is a moving object or an immovable object, upon obtaining the same result successively for a predetermined number of times (for example, eight times), it will take 640 msec for the determination unit 33 to make the determination. In other words, the time required for the user to move from the start zone 35 to the trigger zone 36 is shorter than the time required for the determination unit 33 to make the determination as to whether the object is a moving object or an immovable object. Therefore, in the normal operation, the setting unit 34 does not change the mode to another while the user is moving from the start zone 35 to the trigger zone 36 once the mode is set.

In step S5-2, it is determined whether the determinations of the determination unit 33 indicate that both of the first detection target 7 and the second detection target 7 are immovable objects. If both are immovable objects, the process is returned, without performing any subsequent steps. If at least one of the first detection target 7 or the second detection target 7 is determined not to be an immovable object, the process is shifted to step S5-3. Note that returning in steps S5-1 and S5-2 without performing step S5-3 and subsequent steps means maintaining the current mode setting.

In step S5-3, it is determined whether the first detection target 7 is a moving object and the second detection target 7 is an immovable object. If this condition is met, the process is shifted to step S5-4, and the mode is set to the left access mode and the process is returned. If the condition is not met in step S5-3, by contrast, the process is shifted to step S5-5, and it is determined whether the first detection target 7 is an immovable object and the second detection target 7 is a moving object. If this condition is met, the process is shifted to step S5-6, and the mode is set to the right access mode, and the process is returned. If the condition is not met in step S5-5, by contrast, that is, if both of the detection targets 7 are moving objects, the process is shifted to step S5-7.

Figure 11B:
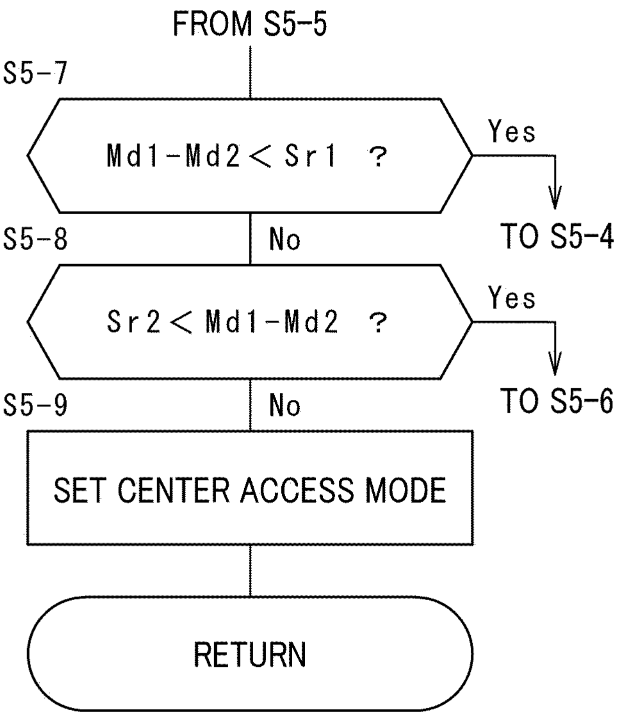
FIG. 11B is a flowchart subsequent to the flowchart in FIG. 11A.

Referring to FIG. 11B, in step S5-7, the setting unit 34 determines whether the difference (Md1-Md2) between the measurement distances Md1, Md2 obtained by the measurement unit 32 is less than the lower bound Sr1 of the setting range Sr. If the condition is met, that is, if the detection target 7 is located on the side nearer to the first detector 13A, the process is shifted to step S5-4 shown in FIG. 11A. The mode is then set to the left access mode and the process is returned. If the condition is not met in step S5-7, the process is shifted to step S5-8.

In step S5-8, the setting unit 34 determines whether the difference (Md1-Md2) between the measurement distances Md1, Md2 measured by the measurement unit 32 is greater than the upper bound Sr2 of the setting range Sr. If the condition is met, that is, if it is indicated that the detection target 7 is located on the side nearer to the second detector 13B, the process is shifted to step S5-6 shown in FIG. 11A. The mode is then set to the right access mode, and the process is returned. If the condition is not met in step S5-8, the process is shifted to step S5-9.

In step S5-9, the setting unit 34 carries out mode setting to the center access mode, and goes back to the previous step. Specifically, if the difference (Md1-Md2) between the measurement distances Md1, Md2 obtained by the measurement unit 32 is within the setting range Sr (Sr1≤Md1-Md2≤Sr2), that is, if the difference indicates that the detection target 7 is located near the center of the back surface of the vehicle body 3, the mode is set to the center access mode.

As described above, in the mode setting process, the setting unit 34 carries out the mode setting to any one of the left access mode, the right access mode, and the center access mode, on the basis of the position where the moving object has made an entry. Therefore, the user who is the moving object can perform the setting movements Sm1, Sm2, Sm3 from that point in time. In this manner, user operability of the door opening and closing apparatus 10 can be improved.

The door opening and closing apparatus 10 configured as described above has the following characteristics.

The setting unit 34 sets at least a part of one of the first detection range 16A and the second detection range 16B as a start zone (first zone) 35 in which a first phase Sm1*a*, Sm2*a* of a setting movement Sm1, Sm2 is to be detected, on the basis of the distances Md1, Md2 measured by the measurement unit 32. The setting unit 34 also sets a part of another one of the first detection range 16A and the second detection range 16B as a trigger zone (second zone) 36 in which a second phase Sm1*b*, Sm2*b* of the setting movement Sm1, Sm2 is to be detected. Therefore, as compared with a configuration in which the start zone 35 and the trigger zone 36 are set to one of the detection ranges 16A, 16B of the respective detectors 13A, 13B, it is possible to ensure an area for allowing the user to perform the setting movements Sm1, Sm2. Therefore, the operability of the user opening and closing the door 2 can be improved.

In the left access mode, because a part of the first detection range 16A is set as the start zone 35 and a part of the second detection range 16B is set as the trigger zone 36, it is possible to improve the operability when the user makes an entry from the left side along the door 2 and makes the setting movement Sm1. In the right access mode, because a part of the second detection range 16B is set as the start zone 35 and a part of the first detection range 16A is set as the trigger zone 36, it is possible to improve the operability when the user makes an entry from the right side along the door 2 and makes the setting movement Sm2.

When the difference between the distances Md1, Md2 measured by the measurement unit 32 is outside the setting range Sr, and the second distance Md2 is greater than the first distance Md1, the setting unit 34 carries out mode setting to the left access mode. When the difference between the distances Md1, Md2 measured by the measurement unit 32 is outside the setting range Sr, and the second distance Md2 is shorter than the first distance Md1, the setting unit 34 carries out mode setting to the right access mode. In other words, the position of the detection target 7 with respect to the door 2 is determined on the basis of the difference between the distances Md1, Md2 measured by the measurement unit 32 and the setting range Sr, and an appropriate mode is set accordingly. Therefore, the operability of the user opening and closing the door 2 can be improved.

In the left access mode, the setting unit 34 sets the first section 17A of the first detection range 16A and the second section 18A of the first detection range 16A excluding a region overlapping with the second section 18B of the second detection range 16B, as the start zone 35. In the right access mode, the setting unit 34 sets the first section 17B of the second detection range 16B and the second section 18B of the second detection range 16B excluding a region overlapping with the second section 18A of the first detection range 16A as the start zone 35. Therefore, it is possible to ensure a large area for the start zone 35 in which the first phase Sa, Sm2*a* of the setting movement Sm1, Sm2 is to be detected. If the area of the start zone 35 is small, by the time the first detector 13A or the second detector 13B detects a user and the setting unit 34 sets the mode, the user might have already moved to the trigger zone 36. Because the start zone 35 has a large area, such inconvenience is less likely to occur.

In the center access mode, the setting unit 34 sets the region where the first detection range 16A and the second detection range 16B overlap each other excluding a region where the second sections 18A, 18B of the first detection range 16A and the second detection range 16B overlaps each other, as the start zone 35. Therefore, it is possible to improve the operability of the time when the user makes the setting movement Sm3 of moving toward the door 2.

The setting unit 34 sets the center access mode when the difference between the distances Md1, Md2 measured by the measurement unit 32 is within the setting range Sr. In other words, the position of the detection target 7 with respect to the door 2 is determined on the basis of the difference between the distances Md1, Md2 measured by the measurement unit 32 and the setting range Sr, and an appropriate mode is set accordingly. Therefore, the operability of the user opening and closing the door 2 can be improved.

When the determination unit 33 determines that the first detection target 7 detected by the first detector 13A is a moving object and the second detection target 7 detected by the second detector 13B is an immovable object, the setting unit 34 carries out mode setting to the left access mode. When the determination unit 33 determines that the first detection target 7 detected by the first detector 13A is an immovable object and the second detection target 7 detected by the second detector 13B is a moving object, the setting unit 34 sets the right access mode. When the determination unit 33 determines that both the first detection target 7 and the second detection target 7 are moving objects, the setting unit 34 performs mode setting on the basis of the difference between the distances Md1, Md2 measured by the measurement unit 32 and the setting range Sr. Therefore, the direction in which the user makes the entry can be determined accurately, and the mode settings can be carried out appropriately.

Note that the present invention is not limited to the configuration according to the embodiment described above, and various modifications are still possible.

For example, the mode setting by the setting unit 34 may not include the center access mode. In the left access mode and the right access mode, specific setting regions can be changed as necessary as long as the start zone 35 is set to a part of one of the first detection range 16A and the second detection range 16B, and the trigger zone 36 is set to a part of the other.

A display device (guidance means) enabled to display the ground in the trigger zone 36 may be provided so as to guide the user by displaying the ground, when the setting movement Sm1, Sm2, Sm3 is to be detected. Such a guidance is not limited to visual guidance, and means for guiding the user auditorily, such as a buzzer, may also be provided.

The invention claimed is:

1. A door opening and closing apparatus comprising:

a driving unit configured to open and to close a door with respect to a vehicle body;

a first detector configured to repeatedly detect a detection target that is present within a first detection range set around the door;

a second detector disposed spaced apart from the first detector in a horizontal direction and configured to repeatedly detect the detection target that is present within a second detection range set around the door in a manner partially, but not entirely, overlapping with the first detection range to thereby define an overlapping region and a non-overlapping region;

a measurement unit configured to measure a first distance from the first detector to the detection target based on a detection result of the first detector, and to measure a second distance from the second detector to the detection target based on a detection result of the second detector;

a setting unit configured to set at least a part of, but less than an entirety of, one of the first detection range and the second detection range as a first zone in which a first phase of a setting movement of the detection target is to be detected, and to set a part of, but less than an entirety of, another one of the first detection range and the second detection range as a second zone in which a second phase of the setting movement is to be detected, based on the first distance and the second distance measured by the measurement unit; and a control unit configured to cause the driving unit to open or to close the door upon determining that the detection target has performed the setting movement including a movement between the first zone and the second zone, based on a change in the first distance and a change in the second distance measured by the measurement unit, wherein the setting unit is:

enabled to set a first access mode and a second access mode in which the first zone and the second zone are set to different positions;

configured to, in the first access mode, set a part of, but less than an entirety of, the first detection range as the first zone, and to set a part of, but less than an entirety of, the second detection range as the second zone, and configured to, in the second access mode, set a part of, but less than an entirety of, the second detection range as the first zone, and to set a part of, but less than an entirety of, the first detection range as the second zone.

2. The door opening and closing apparatus according to claim 1, wherein the setting unit is configured to set the first access mode when a difference between the first distance and the second distance measured by the measurement unit is outside a setting range, and the second distance is greater than the first distance.

3. The door opening and closing apparatus according to claim 2, wherein the setting unit is configured to set the second access mode when a difference between the first distance and the second distance measured by the measurement unit is outside a setting range, and the second distance is smaller than the first distance.

4. The door opening and closing apparatus according to 2, wherein the first detection range is divided into a first portion and a second portion that is closer to the door than the first portion, based on a distance with respect to the first detector, the second detection range is divided into a first portion and a second portion that is closer to the door than the first portion, based on a distance with respect to the second detector, and the setting unit is configured:

in the first access mode, to set the first portion of the first detection range and the second portion of the first detection range excluding a region overlapping with the second portion of the second detection range, as the first zone, and to set the second portion of the second detection range as the second zone; and in the second access mode, to set the first portion of the second detection range and the second portion of the second detection range excluding a region overlapping with the second portion of the first detection range as the first zone, and to set the second portion of the first detection range as the second zone.

5. The door opening and closing apparatus according to claim 1, wherein the setting unit is configured to set the second access mode when a difference between the first distance and the second distance measured by the measurement unit is outside a setting range, and the second distance is smaller than the first distance.

6. The door opening and closing apparatus according to 5, wherein the first detection range is divided into a first portion and a second portion that is closer to the door than the first portion, based on a distance with respect to the first detector, the second detection range is divided into a first portion and a second portion that is closer to the door than the first portion, based on a distance with respect to the second detector, and the setting unit is configured:

in the first access mode, to set the first portion of the first detection range and the second portion of the first detection range excluding a region overlapping with the second portion of the second detection range, as the first zone, and to set the second portion of the second detection range as the second zone; and in the second access mode, to set the first portion of the second detection range and the second portion of the second detection range excluding a region overlapping with the second portion of the first detection range as the first zone, and to set the second portion of the first detection range as the second zone.

7. The door opening and closing apparatus according to claim 1, wherein the first detection range is divided into a first portion and a second portion that is closer to the door than the first portion, based on a distance with respect to the first detector, the second detection range is divided into a first portion and a second portion that is closer to the door than the first portion, based on a distance with respect to the second detector, and the setting unit is configured:

in the first access mode, to set the first portion of the first detection range and the second portion of the first detection range excluding a region overlapping with the second portion of the second detection range, as the first zone, and to set the second portion of the second detection range as the second zone; and in the second access mode, to set the first portion of the second detection range and the second portion of the second detection range excluding a region overlapping with the second portion of the first detection range as the first zone, and to set the second portion of the first detection range as the second zone.

8. The door opening and closing apparatus according to claim 7, wherein the setting unit is:

enabled to set a third access mode in which the first zone and the second zone are set to positions different from the first zone and the second zone set in the first access mode and the first zone and the second zone set in the second access mode, and configured to, in the third access mode, set a region where the first detection range and the second detection range overlap each other, excluding a region where the second portion of the first detection range and the second portion of the second detection range overlap each other, as the first zone, and to set a region where the second portion of the first detection range and the second portion of the second detection range overlap each other as the second zone.

9. The door opening and closing apparatus according to claim 8, wherein the setting unit is configured to set the third access mode when a difference between the first distance and the second distance measured by the measurement unit is within a setting range.

10. The door opening and closing apparatus according to claim 9, further comprising a determination unit configured to determine whether a first detection target that is the detection target detected by the first detector is a moving object or an immovable object based on a change in the first distance measured by the measurement unit, and to determine whether a second detection target that is the detection target detected by the second detector is a moving object or an immovable object based on a change in the second distance measured by the measurement unit, and the setting unit is configured to set the first access mode when the determination unit determines that the first detection target is a moving object and the second detection target is an immovable object, the setting unit is configured to set the second access mode when the determination unit determines that the first detection target is an immovable object and the second detection target is a moving object, and the setting unit is configured to, when the determination unit determines that both the first detection target and the second detection target are moving objects, set one of the first access mode, the second access mode, and the third access mode based on a difference between the first distance and the second distance measured by the measurement unit and a setting range.

11. The door opening and closing apparatus according to claim 8, further comprising a determination unit configured to determine whether a first detection target that is the detection target detected by the first detector is a moving object or an immovable object based on a change in the first distance measured by the measurement unit, and to determine whether a second detection target that is the detection target detected by the second detector is a moving object or an immovable object based on a change in the second distance measured by the measurement unit, and the setting unit is configured to set the first access mode when the determination unit determines that the first detection target is a moving object and the second detection target is an immovable object, the setting unit is configured to set the second access mode when the determination unit determines that the first detection target is an immovable object and the second detection target is a moving object, and the setting unit is configured to, when the determination unit determines that both the first detection target and the second detection target are moving objects, set one of the first access mode, the second access mode, and the third access mode based on a difference between the first distance and the second distance measured by the measurement unit and a setting range.

12. A door opening and closing method comprising:

causing a first detector to repeatedly detect a detection target that is present within a first detection range set around a door, and causing a second detector to repeatedly detect the detection target that is present within a second detection range set around the door in a manner partially, but not entirely, overlapping with the first detection range to thereby define an overlapping region and a non-overlapping region;

measuring a first distance from the first detector to the detection target based on a detection result of the first detector, and measuring a second distance from the second detector to the detection target based on a detection result of the second detector;

setting at least a part of, but less than an entirety of, one of the first detection range and the second detection range as a first zone in which a first phase of a setting movement of the detection target is to be detected, and setting a part of, but less than an entirety of, another one of the first detection range and the second detection range as a second zone in which a second phase of the setting movement is to be detected, based on the measured first distance and second distance;

setting a first access mode and a second access mode in which the first zone and the second zone are set to different positions, wherein in the first access mode, setting a part of, but less than an entirety of, the first detection range as the first zone, and setting a part of, but less than an entirety of, the second detection range as the second zone, and wherein in the second access mode, setting a part of, but less than an entirety of, the second detection range as the first zone, and setting a part of, but less than an entirety of, the first detection range as the second zone; and opening or closing the door upon determining that the detection target has performed the setting movement including a movement between the first zone and the second zone, based on a change in the first distance and a change in the second distance.

* * * * *